United States Patent [19]
Lauritzen et al.

[11] Patent Number: 5,519,961
[45] Date of Patent: May 28, 1996

[54] ANTI-CHAFING LINE COUPLER

[76] Inventors: Conrad A. Lauritzen, 5200 Seahurst Ave., Everett, Wash. 98203; Steven J. Pelham, 21415 86th Ave. West, Edmonds, Wash. 98026

[21] Appl. No.: 243,978

[22] Filed: May 17, 1994

[51] Int. Cl.$^6$ .................................................. A01K 91/04
[52] U.S. Cl. ..................... 43/44.85; 24/128; 24/129 R
[58] Field of Search ............................ 43/44.85, 44.84; 16/2, 3; 24/128, 129 R; 403/392, 398

[56] References Cited

U.S. PATENT DOCUMENTS

| | | | |
|---|---|---|---|
| 3,076,668 | 2/1963 | Famely | 16/2 |
| 3,426,468 | 2/1969 | Hinkson | 43/44.85 |
| 3,533,184 | 10/1970 | Kerr | 43/44.84 |
| 4,149,336 | 4/1979 | Huse | 43/44.84 |
| 4,945,671 | 8/1990 | Jonsson | 43/44.84 |

*Primary Examiner*—Chuck Y. Mah
*Attorney, Agent, or Firm*—Christensen, O'Connor, Johnson & Kindness

[57] ABSTRACT

A line coupler (10) for securing a trailer line (9) to an intermediate section of a diver line (5) with minimal chafing of the lines (5, 9). The line coupler (10) includes a shield (13) that has a cylindrical body (28), and a head (26) and a lip (30) formed at opposite ends of the body (28), so that a channel is formed on the body (28) between the head (26) and lip (30). The shield (13) is slid onto the diver line (5) and butt against a knot (20) on the diver line (5). The top (24) of the head (26) is preferably contoured to mate with the underside of the knot (20). The line coupler (10) preferably includes an annular grommet (22) that is forcibly snapped over the lip (30) onto the body (28). The trailer line (9) is wrapped around the grommet (22) and held in place by a splice (34). The grommet (22) rotates freely with respect to the shield (13), so that the trailer line (9) can rotate around the diver line (5) without chafing. The interior wall (32) of the shield (13) is preferably tapered inward from the head (26) to the lip (32), so that the shield (13) resists sliding away from the knot (20).

14 Claims, 2 Drawing Sheets

ANTI-CHAFING LINE COUPLER

FIELD OF THE INVENTION

This invention relates to buoy rigging of commercial crab pots and, more particularly, to the attachment of a trailer line to a diver line of the buoy rigging.

BACKGROUND OF THE INVENTION

In commercial crab fishing, a crab pot is dropped to the sea floor with a crab line (rope) attached to the bridle of the pot. The free end of the crab line is attached to buoy rigging so that the free end of the crab line is suspended near the water surface. The buoy rigging of a crab pot typically includes two buoys and two lines: a diver buoy and diver buoy line, and a trailer buoy and trailer buoy line. One end of the diver line is secured by knot to the free end of the crab line, and the opposite end of the diver line is secured to the diver buoy, so that the diver buoy keeps the free end of the crab line near the surface. One end of the trailer line is attached to an intermediate section of the diver line, and the opposite end of the trailer line is secured to the trailer buoy. The trailer buoy floats apart from the diver buoy in the direction of current and/or wind, so that the trailer line becomes a bridle, near the water surface, which can be easily caught with a grappling hook to bring the trailer line aboard and haul up the pot by the crab line.

Presently, it is common to attach the diver line to the trailer line using a line splice and an annular grommet that is slipped onto the diver line. In particular, before the diver line is attached to the crab line, a grommet is slipped onto the diver line, and two overhand knots are tied 16 to 24 inches apart on either side of the grommet to restrict its movement along the line. The trailer line is then line spliced to the grommet. The grommet allows the trailer line to turn independently of and slide up and down the diver line, with tides, currents, wind and waves. However, as the diver line spins inside the grommet and the grommet slides between the knots, chafing of the diver line occurs. As wave and tide action raise and lower the diver buoy, a circumvolution of sorts is caused. The diver line winds up one way until it becomes so tight that it can no longer wind in that direction. The diver line then reverses its motion and winds in the opposite direction, almost to the point of contortion. This action continues from the moment the crab pot reaches the sea floor until it is pulled aboard, which can at times be several days.

The resulting chafing of the diver line eventually causes the diver line to break, unless the diver line is replaced on a regular basis. Unfortunately, repairing and replacing chafed diver lines is time consuming and expensive, and takes away from time spent fishing. If a diver line is not regularly replaced, expensive gear can be lost. Not only is the loss of a rigged crab pot itself quite expensive, if a pot is lost and no longer fishing, it is no longer a source of revenue. With the reduction of fishing quotas and the introduction of crab pot limits per boat, the loss of a single pot can amount to a substantial loss of income. Furthermore, with each lost crab pot there is needless waste of crabs. While the netting of a crab pot is required to include cotton twine that rots over time, this twine rots out slowly and many crabs will be trapped and die in the lost pot before the twine rots open. In fact, each season many thousands of crab are trapped and wasted in lost posts.

What is needed is a device that reduces chafing of the diver line by the grommet. The device should reduce chafing while still allowing the diver line to spin independently of the trailer line. The device should also be inexpensive and easy to install. The present invention provides a device that meets these and other needs.

SUMMARY OF THE INVENTION

The present invention provides a line coupler that drastically reduces line chafing. The line coupler includes a shield that has a cylindrical body. A head is formed at one end of the shield's cylindrical body, and a lip is formed at the opposite end of the cylindrical body, so that there is a channel on the outer surface of the body between the head and lip. The head has a larger diameter than the body, and when the shield is installed on a diver line, the head butts against an overhand knot on the diver line. A trailer line is secured to the line shield by forming a spliced loop around the cylindrical body, between the lip and head. Preferably, the line coupler also includes a grommet that is slid onto the cylindrical body of the shield by forcibly snapping the grommet over the lip, which holds the grommet on the shield while allowing the grommet to freely rotate with respect to the cylindrical body. The trailer line is spliced around the grommet and the grommet rotates around the cylindrical body with trailer line.

In accordance with further aspects of the invention, the interior wall of the shield's cylindrical body is tapered, so that the interior diameter of the body narrows towards the lip. The shield is slid by hand onto the diver line head first, until the head butts against a knot in the diver line. The shield's tapered interior wall grips the diver line so as to tend to prevent the shield from sliding along the diver line lip first, i.e., away from the knot against which the head is butted. Securing the shield in this manner eliminates the need for a second knot on the diver line. The shield's head is preferably contoured to a shape that is the converse to the underside of a right-handed overhand knot, so as to tend to prevent the shield from rotating around the diver line.

As will be appreciated from the foregoing brief summary, a line coupler that drastically reduces chafing is provided by this invention. The line coupler is easily installed into crab pot rigging by sliding a cylindrical shield of the line coupler over a diver line, until the shield's head butts against a knot on the diver line. The tapered interior of the shield and the contour of the shield's head prevent the shield from rotating or sliding with respect to the diver line, so that the shield does not chafe the diver line. Preferably, the line coupler includes a grommet that is snapped over the shield's lip, onto the body of the shield, with a trailer line spliced around the grommet. Because the grommet rotates freely around the body of the shield, the trailer line is also not chafed. Furthermore, because the grommet does not slide or spin directly on the diver line as in prior art buoy riggings, chafing of the diver line is eliminated. Rather, the grommet and shield rotate with respect to each other, both of which are very durable. The line coupler can be inexpensively manufactured, e.g., of plastic.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
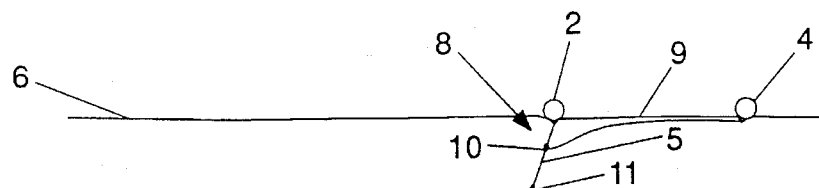
FIG. 1 is side view illustrating a commercial crab pot setup in which a line coupler formed in accordance with the present invention is intended to be used.

FIG. 1 illustrates a typical commercial crab pot setup in which the line coupler 10 provided by the present invention is intended to be used. The crab pot setup includes a crab pot 16, a bridle 14 attached to the crab pot 16, a crab line 12, and buoy rigging 8. One end of the crab line 12 is attached to the bridle 14 and is used to drop and pull the crab pot 16 from the sea floor 18. The opposite end of the crab line 12 is secured to the buoy rigging 8. The buoy rigging 8 allows a fishing crew to easily locate and retrieve the crab pot from a boat.

In particular, the buoy rigging 8 includes a diver buoy 2, a diver buoy line 5, a trailer buoy 4, and a trailer buoy line 9. The diver and trailer buoys 2, 4 float at the sea surface 6. One end of the diver line 5 is attached to the diver buoy 2 and the opposite end of the diver line 5 is tied to one end of the crab line 12 via a crab knot 11, so that the diver buoy 2 holds the crab line 12 near the surface 6. The trailer line 9 is secured at one end to the trailer buoy 4, and the opposite end of the trailer line 9 is secured to an intermediate section of the diver line 5.

In prior art buoy riggings, the trailer line 9 is commonly spliced around an annular grommet that is slid onto the diver line 5 and held between two spaced apart knots tied in the diver line 5. The grommet is then allowed to spin around and slide up and down the diver line 5 between the two knots. As previously explained herein, the problem with this set up is that the grommet chafes the diver line 5 over time, until the line eventually breaks. To overcome this significant problem in the prior art, the present invention provides a line coupler 10 that couples the trailer line 9 to the diver line 5, drastically reducing line chafing.

Figure 2:
FIG. 2 is a side pictorial view of two lines coupled together with a line coupler formed in accordance with the present invention.
Figure 3:
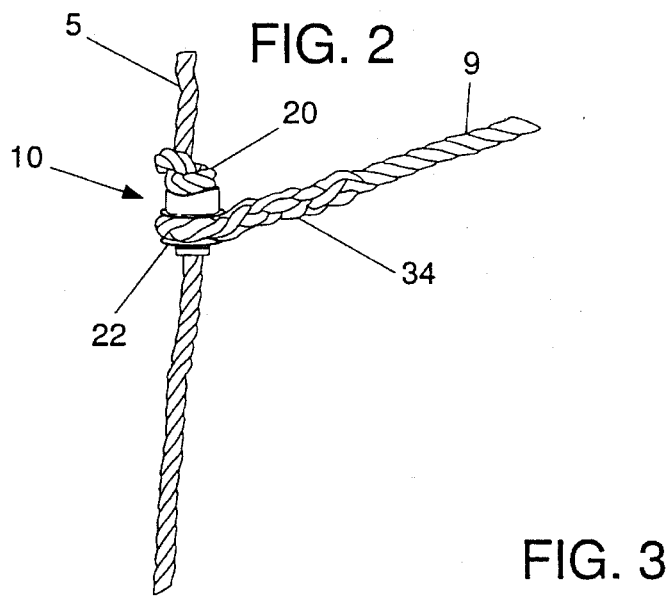
FIG. 3 is a side pictorial view of the shield of the line coupler illustrated in FIG. 2.

The installation of the line coupler 10 can be seen more clearly in FIG. 2. An overhand knot 20 is tied in the diver line 5, and the line coupler 10 is slid onto the diver line 5 until it butts against the knot 20. A splice 34 is formed at one end of the trailer line 9, so that the trailer line 9 is secured around the line coupler 10. The line coupler 10 includes a shield 13, as shown in FIG. 3. Preferably, the line coupler 10 also includes a grommet 22, which is rotatably attached to the shield 13 and around which the splice 34 is formed. The shield 13 is held in place against the knot 20 and the grommet 22 rotates with the trailer line 9 around the shield 13. Because the grommet 22 is not in direct connect with the diver line 5, but instead rotates on the shield 13, line chafing is essentially eliminated.

Figure 4:
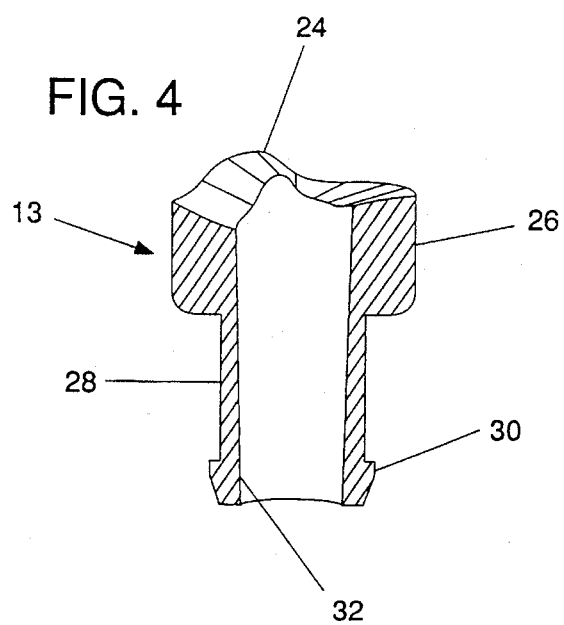
FIG. 4 is a side cross-sectional view of the shield shown in FIG. 3.

The design of the shield 13 is illustrated in detail in FIGS. 3 and 4. As shown in FIG. 3, the shield 13 includes a cylindrical body 28, a head 26 formed at one end of the body 28, and a lip 30 formed at the opposite end of the body 28, so that the body 28 forms a cylindrical channel between the head 26 and the lip 30. The splice 34 of the trailer line 9 is formed around the body 28. In particular, in the preferred embodiment in which the grommet 22 is included, the splice 34 is formed around the grommet 22 and the grommet 22 slipped over the lip 30 onto the body 28. The lip 30 is raised slightly above the outer surface of the body 28, so that the grommet 22 is held on the body 28, while allowing the grommet 22 to be forcibly snapped over the lip 30 onto and off of the body 28.

In the preferred embodiment, the top 24 of the head 26 is contoured to mate with the underside of the overhand knot 20. The contour 24 shown is the converse of the shape of the underside of a right-handed overhand knot, however, various other contours could be formed to mate with other types of knots, right or left-handed. When the head 26 is butt against the knot 20, the contour 24 prevents rotation of the shield 13 about the diver line 5. Eliminating rotation of the shield 13 is desirable, because rotation of the shield 13 can chafe the diver line 5.

The interior structure of the shield 13 is illustrated in the side cross-sectional view of FIG. 4. The center of the shield 13 is hollow, so that shield 13 can be slid over the diver line 5. In the preferred embodiment, the interior wall 32 of the shield 13 tapers inward from the head 26 to the lip 30, so that the interior diameter of the shield 13 decreases from the head 26 to the lip 30. This taper allows the shield 13 to be slid along the diver line 5 head first relatively easily, but resists sliding lip first. Thus, once the head 26 is butt against the knot 20, the taper tends to prevent the shield from sliding away from the knot 20. Eliminating sliding of the shield 13 along the diver line 5 is desirable because sliding of the shield 13 can cause chafing of the diver line 5. Alternative or additional measures can be taken to prevent the shield 13 from sliding. For example, tape could be wrapped around the section of the diver line 5 that the shield 13 covers and the shield 13 would then be slid over the taped section. Or, alternatively, tape could be wrapped around the diver line 5 at the lip end of the shield 13 after the shield 13 is in place, to prevent the shield 13 from sliding away from the knot 20.

Figure 5:
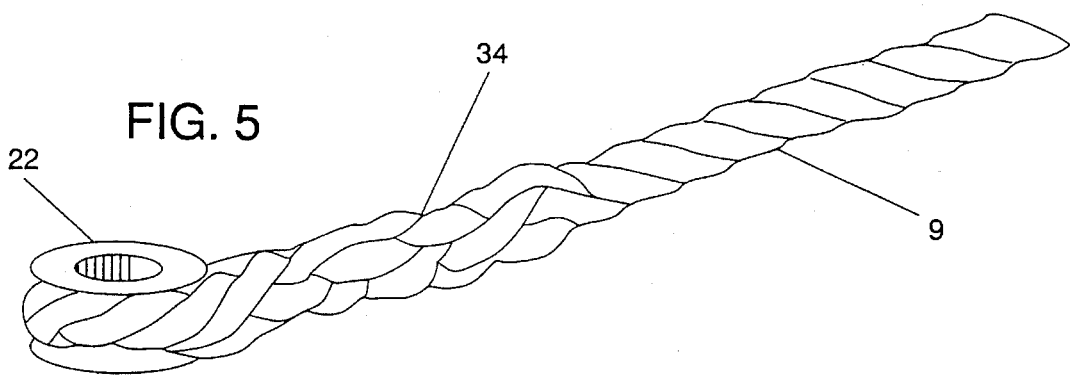
FIG. 5 is a pictorial view of a line spliced around the grommet of the line coupler illustrated in FIG. 2.

The grommet 22 is annular, with a concave exterior surface that forms a channel for holding the trailer line 9, as pictorially illustrated in FIG. 5. The interior of the grommet 22 is hollow, so that the grommet 22 can be slid over the lip 30 onto the body 28 of the shield. One end of the trailer line 9 is wrapped around the circumference of the grommet 22, and then secured by forming the line splice 34. When snapped onto the shield 13, the grommet 22 rotates freely about the shield 13. As a result, rotational friction is restricted to the shield 13 and grommet 22 interface, so that rotational friction on the diver line 5 and trailer line 9 is eliminated. Because the line coupler 10 is very durable, and the shield 13 and grommet 22 interface has a low friction, the line coupler 10 is able to withstand prolonged rotation of the grommet 22.

The line coupler 10 can be formed using existing materials and manufacturing processes. In the preferred embodiment, the line coupler 10 is formed of plastic, e.g., nylon or a nylon/glass composite, using an injection molding process.

While the preferred embodiment of the invention has been illustrated and described, it will be appreciated that various changes can be made therein without departing from the spirit and scope of the invention, as defined by the claims. Furthermore, while the line coupler is described for use in buoy riggings, the line coupler can be used in other applications in which two lines are to be joined while allowing one line to rotate about the other line.

The embodiments of the invention in which an exclusive property or privilege is claimed are defined as follows:

1. A line coupler for joining a first line to a second line so as to allow the first line to rotate about the second line with minimal chafing of the first and second lines, said line coupler including:
   (a) a shield having a substantially cylindrical interior through which the second line is slid so as to position said shield on the second line, said shield further having:
      (i) a substantially cylindrical body; and
      (ii) first and second raised ends formed at opposite ends of said body; and
   (b) an annular grommet having a concave exterior surface for holding a loop formed at one end of the first line around said grommet, said annular grommet for being positioned and rotating around said body between said first and second raised ends, so that the first line can rotate around the second line with minimal chafing of the first and second lines.

2. The line coupler of claim 1, wherein said first raised end is formed by a head that butts against a knot formed in the second line for positioning said shield.

3. The line coupler of claim 2, wherein said second raised end is formed by a lip over which said grommet is forcibly snapped onto said body.

4. The line coupler of claim 2, wherein said substantially cylindrical interior of said shield is tapered inward from said first raised end to said second raised end, so that said shield resists sliding along the second line with said second raised end first.

5. The line coupler of claim 2, wherein said head has a contoured top that butts against said knot formed in the second line, said contoured top has a contour that is the converse of the underside of said knot against which said head butts, so that said contoured top resists rotation of said shield about the second line.

6. The line coupler of claim 5, wherein said substantially cylindrical interior of said shield is tapered inward from said first raised end to said second raised end, so that said shield resists sliding along the second line with said second raised end first.

7. The line coupler of claim 5, wherein said second raised end is formed by a lip over which said grommet is forcibly snapped onto said body.

8. The line coupler of claim 7, wherein said substantially cylindrical interior of said shield is tapered inward from said first raised end to said second raised end, so that said shield resists sliding along the second line with said second raised end first.

9. The line coupler of claim 1, wherein said second raised end is formed by a lip over which said grommet is forcibly snapped onto said body.

10. The line coupler of claim 1, wherein said substantially cylindrical interior of said shield is tapered inward from said first raised end to said second raised end, so that said shield resists sliding along the second line with said second raised end first.

11. A line shield for use in connecting a first line to a second line for minimizing line chafing caused by the first line moving with respect to the second line, said line shield including:
   (a) a body, having a substantially cylindrical exterior surface and a substantially cylidrical interior surface through which the second line is slid so as to position said line shield on the second line;
   (b) a head formed at a first end of said body, said head extending beyond said substantially cylindrical exterior surface of said body, wherein said head butts against a knot formed in the second line for positioning said line shield, said head having a contoured top that butts against said knot formed in the second line, said contoured top having a contour that is the converse of the end of said knot against which said head butts, so that said contoured top resists rotation of said line shield about the second line; and
   (c) a lip formed at a second end of said body, said lip extending beyond said substantially cylindrical exterior surface of said body, wherein said substantially cylindrical exterior surface of said body forms a channel between said head and said lip, and a loop formed at one end of the first line is placed around said cylindrical body between said head and said lip.

12. The line shield of claim 11, wherein said lip is sized to allow an annular grommet to be forcibly snapped onto said body, wherein said loop of the first line is formed around the grommet.

13. The line shield of claim 12, wherein said substantially cylindrical interior surface of said body is tapered inward from said head to said lip, so that said line shield resists sliding along the second line with said lip first.

14. A line shield for use in connecting a first line to a second line for minimizing line chafing caused by the first line moving with respect to the second line, said line shield including:
   (a) a body, having a substantially cylindrical exterior surface and a substantially cylindrical interior surface through which the second line is slid so as to position said line shield on the second line, said substantially cylindrical interior surface of said body being tapered inward from said head to said lip, so that said line shield resists sliding along the second line with said lip first;
   (b) a head formed at a first end of said body, said head extending beyond said substantially cylindrical exterior surface of said body, wherein said head butts against a knot formed in the second line for positioning said line shield; and
   (c) a lip formed at a second end of said body, said lip extending beyond said substantially cylindrical exterior surface of said body, wherein said substantially cylindrical exterior surface of said body forms a channel between said head and said lip, and a loop formed at one end of the first line is placed around said cylindrical body between said head and said lip.

* * * * *